Sept. 23, 1941.  M. STEINER  2,256,532

TYING MACHINE

Filed May 4, 1940  7 Sheets-Sheet 1

INVENTOR.
MAX STEINER

BY Richards & Geier
ATTORNEYS.

Sept. 23, 1941.　　　　　M. STEINER　　　　　2,256,532

TYING MACHINE

Filed May 4, 1940　　　　　7 Sheets-Sheet 6

INVENTOR.
MAX STEINER,
BY
ATTORNEYS.

Sept. 23, 1941.  M. STEINER  2,256,532
TYING MACHINE
Filed May 4, 1940  7 Sheets-Sheet 7

INVENTOR.
MAX STEINER
BY Richardson Geier
ATTORNEYS.

Patented Sept. 23, 1941

2,256,532

UNITED STATES PATENT OFFICE 2,256,532

TYING MACHINE

Max Steiner, River Edge, N. J.

Application May 4, 1940, Serial No. 333,300

10 Claims. (Cl. 28—1)

This invention relates to a textile machine and refers more particularly to a machine for tying comparatively short threads upon a longer thread or yarn.

In my co-pending application for Letters Patent, Serial No. 308,913, filed December 13, 1939, relating to Novelty yarns and methods of manufacturing the same, I have described a novelty yarn having a plurality of knots carrying comparatively short threads, pile beams, or the like, which extend through these knots and/or are suspended therefrom.

An object of the present invention is the provision of a machine for manufacturing novelty yarns of this type.

Another object is the provision of a tying machine which is comparatively inexpensive to manufacture and effective in operation and which can be utilized for tying short lengths of thread or the like upon another continuously supplied thread.

Other objects of the present invention will become apparent in the course of the following specification.

In accomplishing the objects of the present invention it was found desirable to provide a machine comprising a plurality of flights arranged in the form of an endless belt, and moving for a part of their way along a stretched yarn. Each of these flights is engaged in a suitable position by a flight operating mechanism which causes a device carried by each flight to engage a portion of the yarn, twist it, form a knotted loop therein and then project a thread or the like through that loop, whereupon a small piece of the projected thread is cut off, the loop is tied into a knot by tensioning the yarn and the connection between the stretched yarn and that flight is interrupted.

The invention will appear more clearly from the following detailed description when taken in connection with the accompanying drawings showing, by way of example, a possible embodiment of the inventive idea.

In general, Figures 14 to 23 of the drawings show a machine for making the novelty yarn illustrated in Figures 1 to 5, while the operation of the machine is indicated diagrammatically in Figures 6 to 13.

Figures 9, 10, 11, 12, 13, 15:
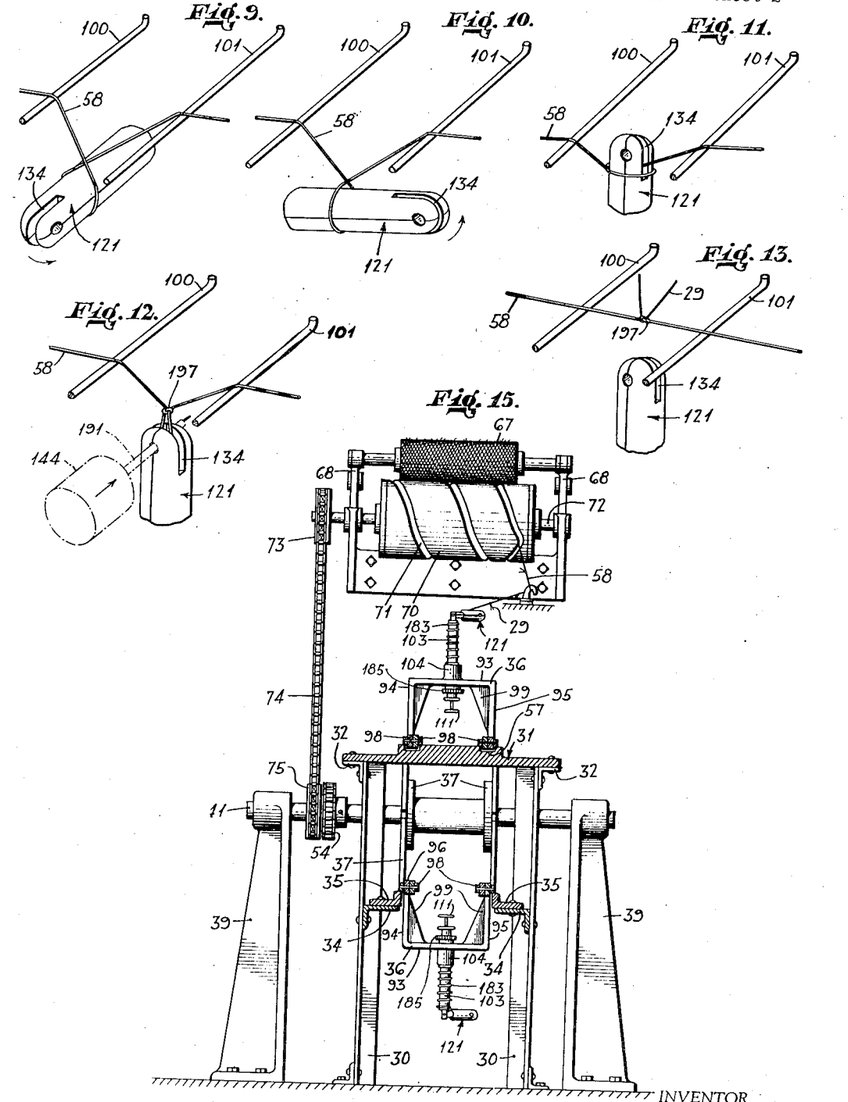
Figure 15 is a vertical section along the line 15—15 of Figure 14.
Figure 14:
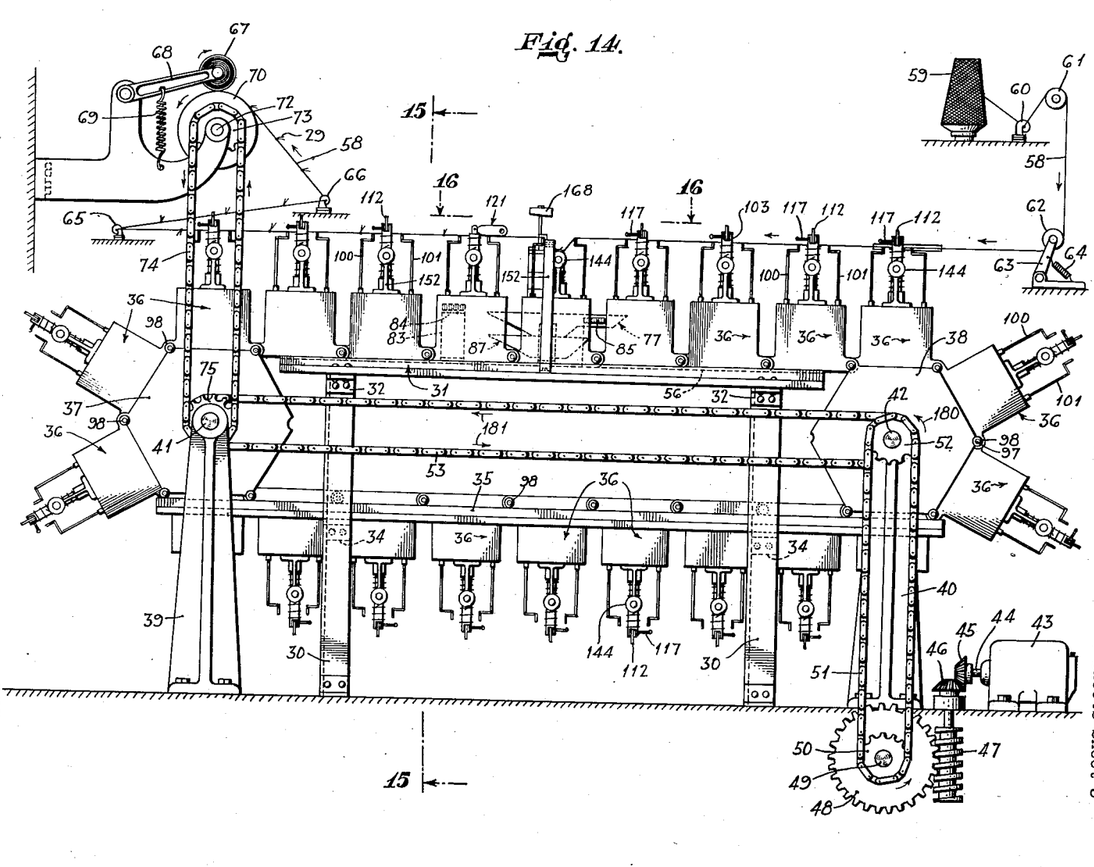
Figure 14 shows the machine in side elevation.
Figure 17:
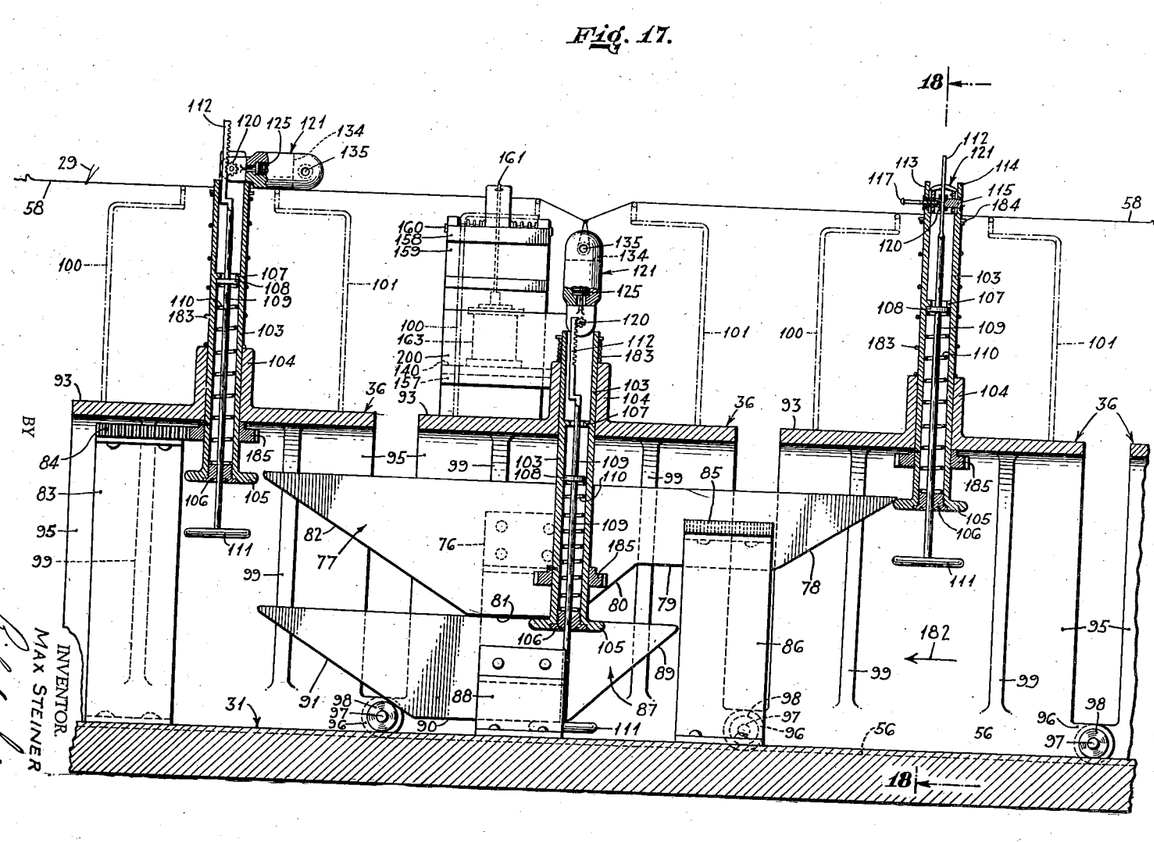
Figure 17 is a vertical section along the line 17—17 of Figure 16.
Figure 18:
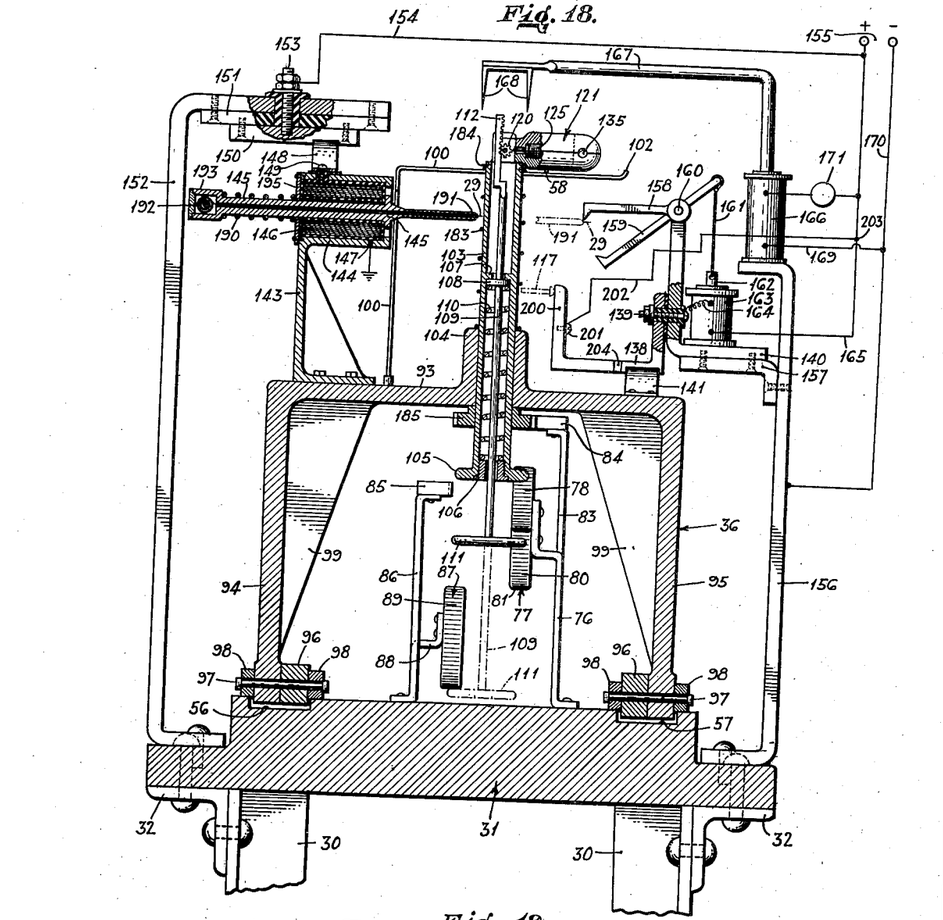
Figure 18 is a vertical section along the line 18—18 of Figure 17.

The machine comprises a flight drive shown in Figure 14, a yarn feed shown in Figures 14 and 15 and a flight operating mechanism shown best in Figures 17 and 18. Each of the flights is provided with a knotting mechanism shown in Figures 17, 18 and 20 to 23, and a thread inserting mechanism shown best in Figures 18 and 19. Figure 18 also shows the thread clamp and the thread cutter.

The flight drive comprises supports or legs 30 (Figures 14 and 15) carrying a cam supporting table 31 riveted to the supports 30 by the angle irons 32.

The supports 30 also carry brackets 34 serving as carriers for guide rails 35. The rails 35 are used for guiding the return movement of the flights 36.

Figure 16:
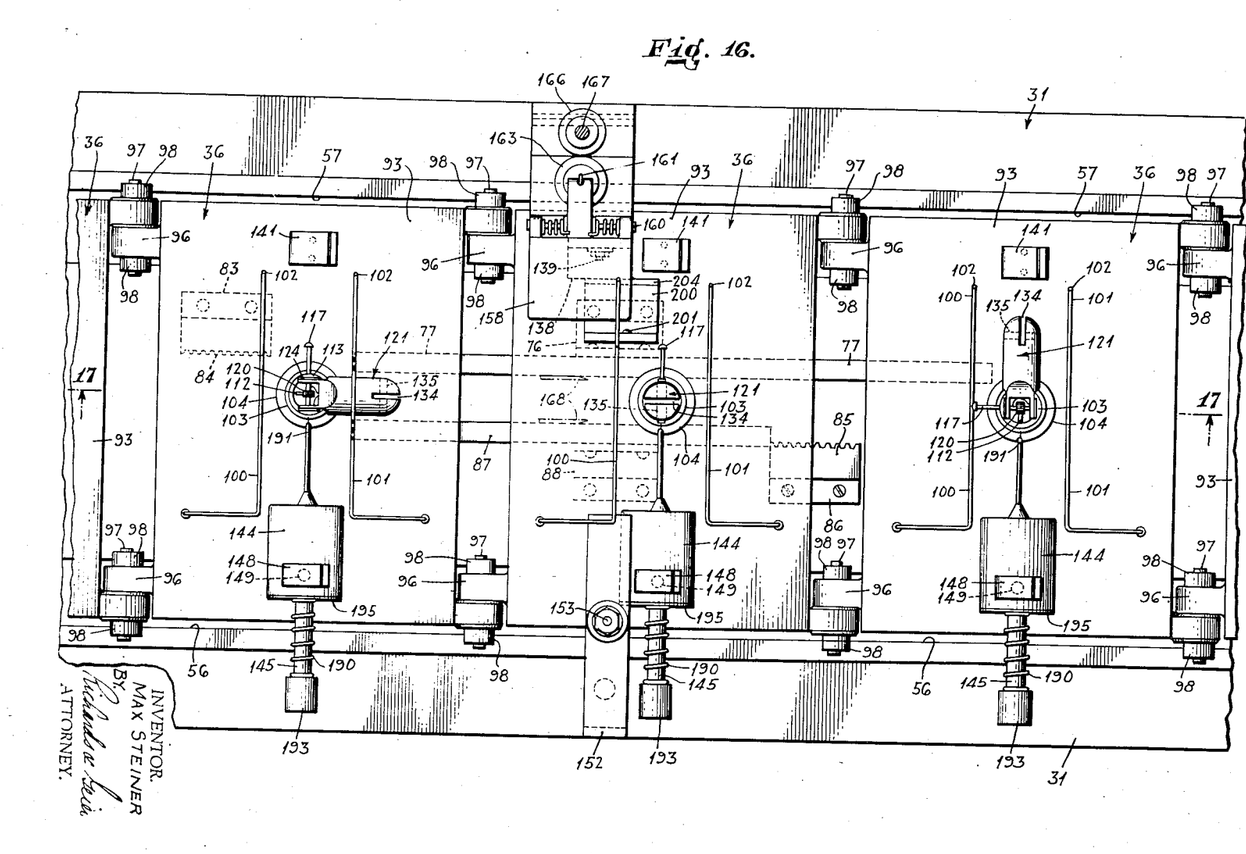
Figure 16 is a plan view on an enlarged scale, looking in the direction of the arrows 16—16 of Figure 14.

As shown in Figures 14, 16 and 18, the flights 36 constitute an endless chain the upper part of which is moved in parallel grooves 56 and 57 provided in the table 31, while the lower part is moved along guides 35.

Two sprocket wheels 37 and 38 are situated at opposite ends of the table 31 and are carried by stanchions or pillow blocks 39 and 40, respectively.

The sprocket 37 is mounted upon a shaft 41 carried by two stanchions 39 (Figure 15). The sprocket 38 is carried in a similar manner by the shaft 42, supported by stanchions 40.

As shown in Figure 14, the flights 36 which constitute an endless chain, extend over the sprockets 37 and 38.

The machine drive includes a motor 43 the shaft 44 of which carries a bevel wheel 45 meshing with a bevel wheel 46 which is integral with the worm 47. A gear wheel 48 meshes with a worm 47 and is firmly connected by the shaft 49 with a pinion 50 embraced by an endless chain 51.

The shaft 42 is firmly connected with a gear wheel 52 which is engaged by the same chain 51. Thus, the rotation of the motor shaft 44 is transmitted to the sprocket 38.

Another wheel (not shown) keyed upon the sprocket shaft 42 carries an end of a horizontal endless chain 53. The chain 53 passes over a wheel 54 (Figure 15) which is firmly mounted upon the sprocket shaft 41. Thus, the rotation of the sprocket 38 is transmitted to the sprocket 37. The yarn 58 upon which the threads 29 are to be attached, is supplied by a feed cone 59 and passes over a guide 60, a roll 61 and a tensioning roll 62 carried by a lever 63 and loaded by the spring 64. The yarn 58 extends at a certain distance above the cam supporting table 31 thus making it possible for the flights 36 to carry out the tying operations upon the yarn. Then the yarn passes over an eye 65, another eye 66 and is wound upon a take-up roll 67. The roll 67 is carried by arms 68 which are pressed by springs 69 against a winding cylinder 70 provided with grooves 71 (Figure 15) and used to wind the yarn 58 in the form of helical coils.

The shaft 72 of the winding cylinder 70 carries a sprocket 73 which is keyed upon that shaft and which carries the endless chain drive 74. The sprocket shaft 41 carries a sprocket 75 which is also embraced by the chain 74. Thus, the rotation of the sprocket 37 is transmitted by the shaft 41, the wheel 75, the chain 74, the wheel 73 and the shaft 72 to the winding cylinder 70.

The flight operating mechanism is carried by the table 31 and is best illustrated in Figures 17 and 18. This mechanism includes a support 76 which is riveted to the table 31 and carries a cam 77 having a downwardly inclined surface 78, a horizontal surface 79, another downwardly inclined surface 80, a second horizontal surface 81, and an upwardly inclined surface 82; another support 83 which is riveted to the table 31 carries a rack 84.

A second rack 85 is carried by a support 86. A second cam 87 is carried by a support 88 and includes a downwardly inclined surface 89, a horizontal surface 90 and an upwardly inclined surface 91.

The cams 77 and 87 and the racks 84 and 85 must be situated at a predetermined distance from each other and from other parts of the machine to enable the mechanism carried by the flights 36 to function properly. The purpose of the cams and racks and the operation of the mechanism will be described in detail hereinafter.

The flights 36 are best illustrated in Figures 16 to 18. Each of the flights 36 includes a horizontal supporting portion 93 and two side portions 94 and 95 (Figure 18), and is provided with four eyes or sleeves 96 (Figure 16) which extend close to corresponding sleeves provided in the adjacent flights. Ribs or web 99 extend between the upper portion 93 and the sides 94 and 95 of the flights 36. Pins or axles 97 pass through pairs of adjacent sleeves belonging to different flights and thus pivotally connect the flights with each other. The axles 97 also carry wheels 98 which are used for moving the flights along the table 31 and the guides 35.

The portion 93 of each flight 36 carries yarn tensioning wires 100 and 101. The bottom ends of these wires are attached to the horizontal portion 93 of the flight. The wires are bent toward each other and have long parallel portions which extend horizontally and which terminate in hooked ends 102.

The wires 100 and 101 are adapted to engage from underneath the yarn 58 and are used to tension that portion of the yarn which is situated between them.

Figure 20:
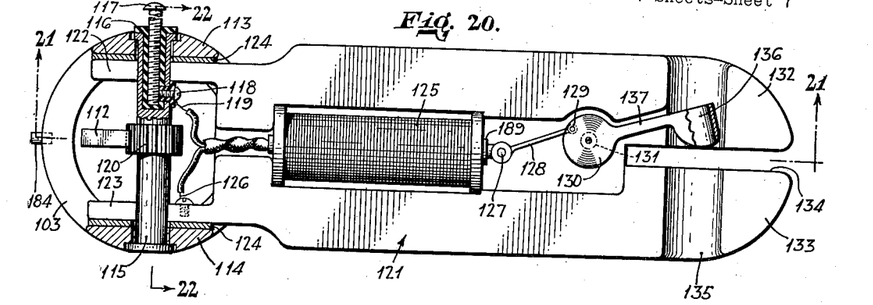
Figure 20 shows the knotting arm in section on an enlarged scale.
Figures 21, 22, 23:
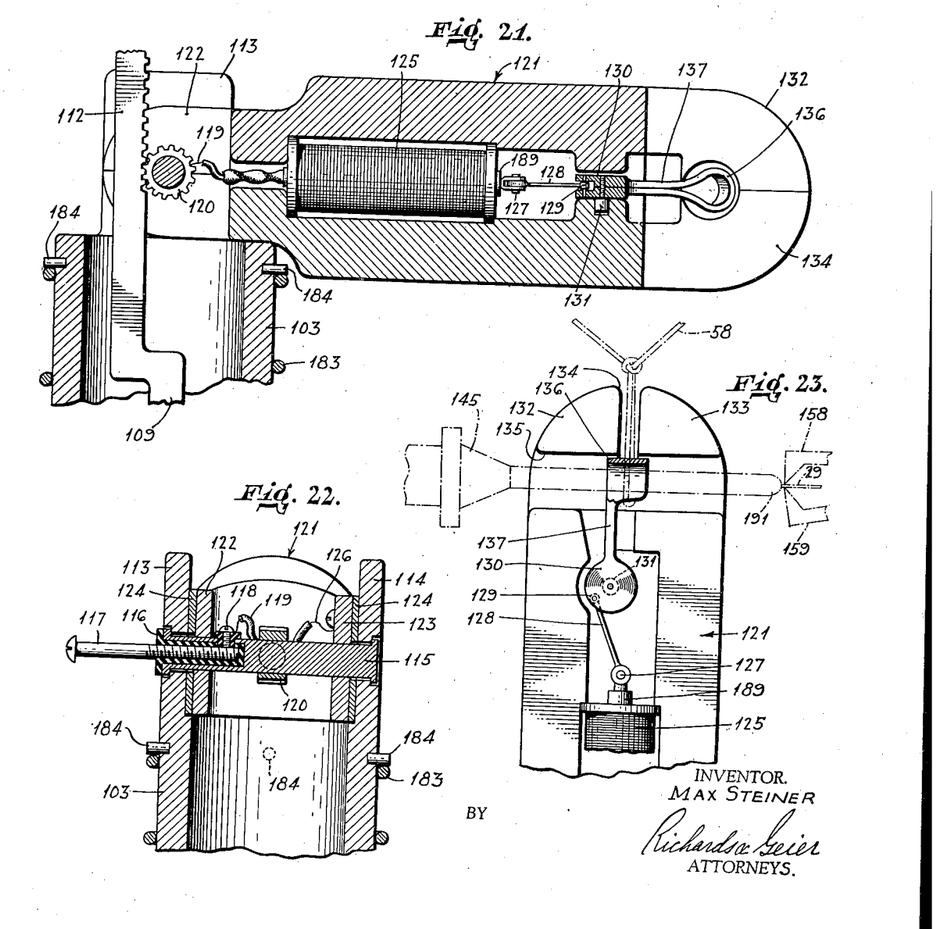
Figure 21 is a section along the line 21—21 of Figure 20.
Figure 22 is a section along the line 22—22 of Figure 20.
Figure 23 shows a part of the knitting arm in section to illustrate the knot tying operation.

The looping mechanism of each flight 36 comprises an elongated tube 103 which extends through a vertical sleeve 104 provided in the horizontal portion 93 of the flight. A gear wheel 185 is keyed upon the tube 103. The lower end 105 of the tube 103 has the form of a flange or wheel provided with inner screw threads which are engaged by the outer screw threads of a sleeve or stopper 106. An annular rib 107 is situated within the tube 103 intermediate the ends of the tube and serves as an abutment for a disc 108 which is firmly connected with a rod 109. The rod extends through the tube 103 and is supported therein by a coiled spring 110. The upper end of the spring 110 engages the disc 108, while its lower end engages the stopper 106. The lower end of the rod 109 is integral with or carries a wheel 111. The upper end of the rod 109 has the form of a rack 112. The tube 103 is maintained in place by an outer coil spring 183 the upper end of which engages a projection 184 carried by the tube 103. The lower end of the spring 183 engages the sleeve 104. The upper end of the tube 103 consists of two parallel supports 113 and 114 carrying a pivot or pin 115, as best shown in Figures 20 to 22. One end of the pin 115 is hollow and carries an insulating tube 116. A conducting contact 117 having the form of a bolt is situated within the tube 116 and is conductively connected with another insulated contact 118. A conducting wire 119 is operatively connected with the contact 118.

A gear wheel 120 is keyed upon the pin 115 and meshes with the rack 112.

The knotting arm 121 is provided with two parallel prongs or end portions 122 and 123 which are firmly mounted upon the pin 115 and are rotatable therewith. Washers 124 separate the portions 122 and 123 of the arm 121 from the supports 113 and 114. The interior of the arm 121 is hollow and contains a solenoid coil 125, one end of which is attached to the wire 119. The opposite end of the solenoid coil 125 is connected with a grounded wire 126.

The movable core 189 of the solenoid 125 is pivotally connected at 127 with one end of a connecting rod 128, the opposite end of which is eccentrically pivoted at 129 to a disc 130. The disc 130 is mounted within the arm 121 by a pin 131.

The free end of the arm 121 is bifurcated and has two ends 132 and 133 separated by a slot 134. A passage 135 extends through the ends 132 and 133 and contains an eye 136 having the form of a sleeve the ends of which constitute arms 137 which may be integral with the disc 130.

As shown in Figure 16, the contact 117 is adapted to engage an angular conducting element 200. The conducting element 200 (Figure 18) is insulated from the angular conducting element 138 by means of the insulating strip 204. The element 200 is also connected to the positive side of the power source 155 at 203 by means of the screw connection 201 and the wire 202. Thus when the contact 117 engages the conducting element 200 the solenoid 125 is energized.

Figure 19:
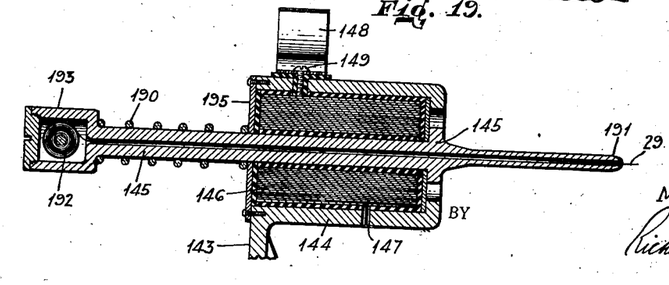
Figure 19 is a section showing the thread inserting mechanism illustrated in Figure 18 on a larger scale.

The thread inserting device is best shown in Figures 18 and 19 and is carried by a support 143 which is screwed to the upper surface of the flight 36. The upper portion of the support 143 has the form of a hollow cylinder 144 containing an elongated tube 145.

The tube 145 constitutes the movable core of a solenoid having a solenoid coil 146. The tube 145 contains the thread 29 which is wound in the form of a package 192 situated within a cartridge 193 which is integral with the tube 145. One end of the thread 29 projects out of the end 191 of the tube 145. A spring 190 presses against the cartridge 193 and a plate 195 attached to the casing 144. The spring 190 maintains the tube 145 in the position shown in Figure 19.

One end of the solenoid coil 146 is grounded to the frame at 147 while the other end is conductively connected by a conducting bolt 149 with a clip contact 148. The contact 148 is mounted upon the cylinder 144 and is insulated therefrom.

As shown in Figure 18, in a predetermined position of the flight 36, the contact 148 is adapted to engage a conducting plate 150 which is screwed to an insulating plate 151. The insulating plate 151 is carried by the bent end of a bracket 152 which is riveted to the table 31.

A conducting bolt 153 which is insulated from the bracket 152 connects the conducting plate 150 with a wire 154 leading to the terminals 155 of a source of electrical energy.

The clamping device for the thread 29 is carried by a support 156 which is riveted to the table 31. The support 156 carries a bracket 157 which is connected by bolts to the arm 140.

The arm 140 is firmly connected with the immovable arm 158 of the clamping device. The movable arm 159 of the clamp is pivoted intermediate its ends at 160 to the arm 140 and its opposite end is connected by a rod 161 with the movable core 162 of a solenoid 163.

A wire 164 connects one end of the coil of the solenoid 163 with the conducting bolt 139 and the angular contact member 138. The opposite end of the solenoid coil is connected by the wire 165 with the terminals 155.

The clamping device is actuated as soon as a grounded contact clip 141 which is carried by the flight 36 is brought into contact with the conducting element 138.

The thread cutting device is also carried by the bracket 156 and includes a solenoid 166, the movable core of which is connected with an arm 167 carrying the knives 168. One end of the coil of the solenoid 166 is connected by the wires 169 and 170 to one of the terminals 155 and to the ground. The opposite end of the coil of the solenoid 166 is connected to a time switch 171 which is connected to the other one of the terminals 155 by the wire 165.

The machine is operated as follows:

When the motor 43 (Figure 14) is started, the rotation of its shaft 44 will be transmitted by the bevel gears 45 and 46, the worm 47, the gears 48 and 50, the chain 51, the sprocket 52 and the shaft 42, to the flight supporting sprocket 38, so that this sprocket will be rotated in the direction of the arrow 180. The chain drive 53 will transmit this rotation to the sprocket wheel 37 so that the endless belt of flights 36 will move in the direction of the arrows 181.

At the same time, the chain drive 74 will actuate the winding roll 70, so that the yarn 58 will be unwound from the feed cone 59 and will pass through the guide 60 and over the rolls 61 and 62.

Between the roll 62 and the eye 65, the yarn 58 will extend horizontally at a predetermined distance above the table 31 and close to the flights 36 travelling upon that table. The position of this horizontally stretched part of the yarn 58 relatively to the flights 36 is such that as soon as a flight 36 is moved by the sprocket 38 to a horizontal position in alignment with the table 31, the arms 100 and 101 of that flight will engage the yarn 58 from underneath, while the knotting arm 121 will extend above the yarn 58 and will engage the yarn from above. This is accomplished by the provision of any suitable guide (not shown) which is well known in the art, which will not interfere with the movement of the flight into its horizontal position and which will enable the knotting arm 121 to engage the yarn from above. This position is shown diagrammatically in Figure 6 of the drawings.

The yarn 58 will move along with the flights 36, due to the rotation of the winding roll 70 (Figure 14).

Figures 6, 7, 8:
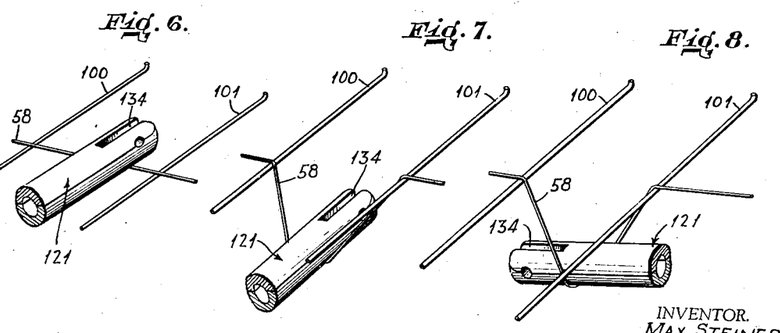
Figures 6 to 13 are perspective diagrammatic views illustrating the manner in which the machine operates to tie a knot on the yarn and to pass a piece of thread therethrough.

The position shown in Figure 6 is maintained until a flight 36 reaches the cam 77. As shown in Figure 17, the downwardly inclined surface 78 of the cam 77 is so disposed in relation to the flights that the cam follower or wheel 105 carried by a flight will engage the upper end of the inclined surface 78, in the course of the forward movements of that flight in the direction of the arrow 182. The wheel 105 will move downwardly along the surface 78, and the tube 103 and the knotting arm 121 will move along with the wheel 105, thereby compressing the spring 183. Thus, the knotting arm 121 tensions the portion of the yarn 58, situated between the supports 100 and 101 and pulls this portion downwardly, as it is indicated diagrammatically in Figure 7.

As soon as the lower end of the surface 78 (Figures 17 and 18) is reached, the gear wheel 185 carried by the tube 103 is brought into engagement with the teeth of the rack 85 carried by the support 86. In the course of the further movement of the flight, the engagement of the immovable rack 85 with the moving gear 185 causes the tube 103 and the arm 121 to turn firstly to the position shown in Figure 8, then to the position shown in Figure 9 and finally to the position shown in Figure 10, thereby winding the yarn 58 in the form of a loop upon the arm 121. The rack 85 is so dimensioned that it causes the arm 121 to turn to a total extent of 270 degrees.

While the gear 185 is in engagement with the rack 85, the wheel 105 slides along the horizontal surface 79 of the cam 77 (Figure 17). However, as soon as the wheel 185 leaves the rack 85 and while the wheel 105 is still in engagement with the horizontal surface 79, the lower wheel 111 is brought into engagement with the downwardly inclined surface 89 of the cam 87. Then the wheel 111 which is firmly connected to the rod 109 and the rack 112, is moved downwardly in relation to the tube 103. Since the rack 112 is in engagement with the pinion 120 which is firmly connected to the arm 121 by the pin 115, the downward movement of the rack 112 will turn the pin 115 and thereby swing the arm 121 upwardly until it is moved into the position shown in Figure 11. In the course of this upward movement of the arm 121, a part of the thread 58 will move into the slot 134 of the arm 121, as shown in Figure 11.

Due to the rotation of the tube 103 which was caused by the rack 85, the contact pin 117 is moved closely to the angular contact element 200 (Figures 16 and 18). As soon as the movement of the flight 36 brings the pin 117 into engagement with the conducting element 200 an electrical circuit will be established which will cause the energization of the solenoid 125 situated within the knotting arm 121 (Figure 18). This circuit will include one of the terminals 155, the wire 202, the conducting element 200, the contact 117, the contact 118 (Figure 20), the wire 119 and the solenoid coil 125. As already stated, the second terminal 155 and the other end of the coil 125 are both grounded.

The solenoid coil 125 (Figure 20) will be energized and its core 189 will move outwardly along with the rod 128, thereby turning the disc 130 about its pivot 131 and swinging the eye 136 from the position shown in Figure 20 to the position shown in Figure 23. In the latter position the eye 136 is situated within the slot 134 and below that portion of the thread 58 which was moved within the slot 134.

Shortly after this movement of the eye 136 has taken place, the wheel 105 (Figure 17) of the flight 36 reaches the end of the horizontal surface 79 of the cam 77. Thereafter the wheel 105 will slide downwardly along the inclined surface 80 of the cam 77, while the wheel 111 will continue its downward movement along the surface 89 of the cam 87, so that no relative movements between the tube 103 and the rack 112 will take place and both the tube 103 and the rack 112 will move jointly downwards. The loop of the yarn 58 which is wound around the arm 121 will slip off that arm and will be tensioned by the eye 136, as shown in Fig. 23.

Shortly thereafter, the further movement of the flight 36 will bring the contact 148 into engagement with the conducting plate 150 (Figure 18). Then the thread inserting device will be actuated by the energization of the solenoid 146. An electrical current will flow from one of the terminals 155 through the wire 154, the conducting bolt 153 and the plate 150 to the spring contact 148 which is conductively connected with one end of the solenoid coil 146. As already stated, the other end of the terminals 155 and the other end of the solenoid coil 146 are both grounded to the frame of the machine.

The solenoid coil 146 will cause a movement of the end of the tube 145 through the passage 135 provided in the knotting arm 121 and through the eye 136, thereby compressing the spring 190. As shown in Figure 23, an end of the thread 29 will project outside of the end 191 of the tube 145 and this projecting end will be situated close to the clamping arms 158 and 159.

Shortly thereafter the conducting spring 141 (Figure 18) carried by the flight 36 will be brought into engagement with the L-shaped conducting element 138. Then another electrical circuit will be established and the current will flow from one of the terminals 155 through the wire 165 and the coil of the solenoid 163 to the wire 164, the conducting bolt 139, the conducting element 138 and the spring 141 which is grounded to the frame, as is the other one of the terminals 155. The solenoid 163 will be energized and the solenoid core 162 will move downwardly along with the rod 161, thereby swinging the arm 159 of the clamping device toward the arm 158 and clamping that end of the thread 29 which projects outside of the tube 145.

Shortly thereafter, the continuous forward movement of the flight 36 will interrupt the contact between the plate 150 and the contact 148. Then the solenoid 146 will be deenergized and the spring 190 will move the tube 145 back to the position shown in Figure 18. In the course of the return movement of the tube 145 some of the thread 29 will be unwound from the package 192 situated within the yarn cartridge 193 and will be stretched between the clamping device 158, 159 and the tube 145, extending through the eye 136 which engages the loop of the yarn 58 (Figure 23).

As already stated, the solenoid 166 (Figure 18) is operated intermittently by the time switch 171. The solenoid 166 is connected by the wire 165, the time switch 171 and the wires 169 and 170 to the terminals 155, so that the energization of the solenoid 166 depends solely upon the timing of the switch 171.

The switch 171 is so set that as soon as the thread 29 is stretched between the clamping device 158, 159 and the tube 145, the solenoid 166 will be energized and will move downwardly the arm 167, causing the knives 168 to cut off that piece of thread 29 which extends through the eye 136. A small piece of thread remains clamped between the arms 158 and 159 and the position of the knives 168 is so chosen that after the completion of the cutting a small piece of thread remains outside of the end 191 of the tube 145, thus making it possible to repeat the clamping operation with the next flight 36.

As soon as the piece of thread 29 has been cut off, the time switch 171 is deenergized and then the arm 167 is moved back into the position shown in Figure 18.

In the course of the further movement of the flight 36 the engagement between the spring contact 141 and the conducting element 138 is interrupted and then the solenoid 163 is deenergized. The core 162 along with the rod 161 moves back into position shown in Figure 18, thereby moving the clamping arm 159 away from the arm 158.

Shortly thereafter, the conducting pin 117 is moved by the flight 36 out of engagement with the conducting element 200. Then the solenoid coil 125 is deenergized and the solenoid core 189 will move inwardly, swinging the eye 136 back into the position shown in Figure 20. Then the cut off portion of the thread 29 will be supported directly by the loop formed in the yarn 58. Since the yarn 58 is under tension caused by the tensioning roll 62 (Figure 14), the take up roll 67 and the downwardly moving arm 121 of a subsequent flight 36, the loop formed in the thread 58 will be pulled to form a knot holding the piece of thread 29 intermediate its ends.

As shown in Figure 17, the upward movement of the cam follower 105 along the upwardly inclined surface 82 of the cam 77 begins while the wheel 111 continues its movement along the horizontal surface 90 of the cam 87. Thus a relative movement of the tube 103 in relation to the rack 112 takes place and this relative movement causes the knotting arm 121 to swing from its vertical position back into the horizontal position.

This relative movement is completed as soon as the wheel 111 terminates its motion along the horizontal surface 90 and proceeds to move upwardly along the upwardly inclined surface 91 of the cam 87. Thereafter the cam followers or wheels 105 and 111 move upwardly as a single unit until they both leave at the same time the surfaces 82 and 91 of the cams 77 and 87. Then the tube 103 is returned into its uppermost position illustrated in Figure 18.

In the course of the continuing forward movement of the flight 36, the gear 185 engages the rack 84 (Figure 17) and as the flight 36 proceeds along the rack 84, the tube 103 is turned back to an extent of 270 degrees until it is returned to its initial position.

The described operations are repeated as soon as each of the flights 36 is brought into a predetermined position upon the table 31. Therefore, the yarn 58 will be provided with a plurality of short threads 29 which will be tied upon the yarn 58. The yarn carrying the short threads 29 will pass through the eye 65 shown in Figure 14, and will move over the eye 66 and into the groove 71 of the winding roll 70. The finished yarn will be wound in the form of helical coils upon the take up roll 67.

Figure 1:
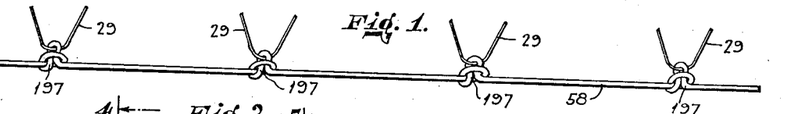
Figure 1 shows a novelty yarn made on a machine constructed in accordance with the principles of the present invention.
Figure 2:
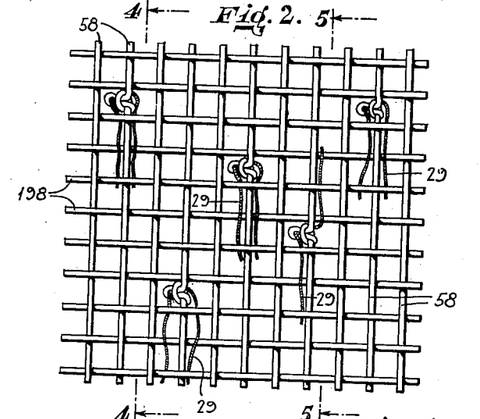
Figure 2 is a diagram illustrating on an enlarged scale a fabric made in part from the novelty yarn shown in Figure 1.

The completed novelty yarn is shown in Figure 1 of the drawings. It consists of a yarn 58 comprising several knots 197 carrying short pieces of thread 29.

It is advisable not to tie the knots 197 at equal distances from each other, but to vary in a suitable manner the distances between the individual knots. This may be conveniently accomplished by varying the speed of movement of the flights 36 in relation to that of the thread 58 and can be accomplished by inserting blank flights into the endless chain, or by any well known means not illustrated in the drawings.

Figure 3:
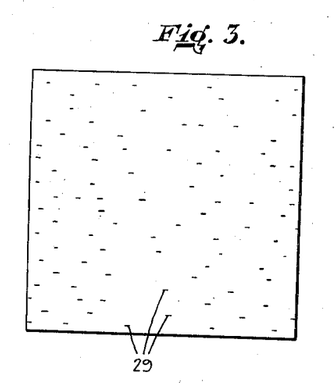
Figure 3 shows a piece of fabric having the mottled effect produced by the yarn shown in Figure 1.
Figure 4:
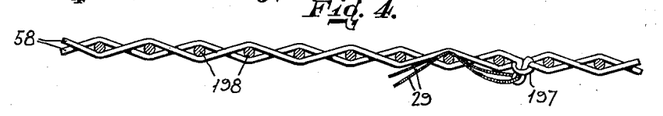
Figure 4 is a section along the line 4—4 of Figure 2.
Figure 5:
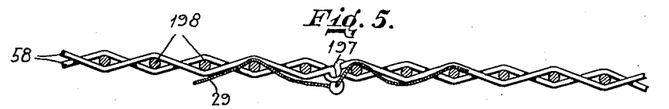
Figure 5 is a section along the line 5—5 of Figure 2.

Whenever the novelty yarn shown in Figure 1 is used for weaving a fabric and constitutes the weft threads of that fabric, the threads 29 will extend between the warp threads 198, as indicated diagrammatically in Figures 2 to 5. The finished fabric which is shown in Figure 3 has an unusual mottled effect resulting from the presence of the knots 197 and threads 29.

It is apparent that the specific illustration shown above has been given by way of illustration and not by way of limitation and that the structures above described are subject to wide variation and modification without departing from the scope or intent of the invention, all of which variations and modifications are to be included within the scope of the present invention.

What is claimed is:

1. In a textile tying machine, in combination, means moving a yarn substantially in the direction of its length, means engaging said yarn intermediate its ends to form a knotted loop therein, means moving said yarn-engaging means substantially in the direction of movement of said yarn while said loop is being formed, means passing a thread through said loop, and means tensioning said yarn to cause said loop to form a knot holding said thread.

2. In a textile tying machine, in combination, a knotting arm engaging a stretched yarn, means moving said knotting arm relatively to said yarn to wind a portion of the yarn intermediate the ends of the yarn about said knotting arm to form a knotted loop in said portion of the yarn and to withdraw said knotting arm from said loop, means passing a thread through said loop, and means tensioning said yarn to cause said loop to form a knot holding said thread.

3. In a textile tying machine, in combination, a knotting arm engaging a stretched yarn and having a bifurcated end comprising two prongs and a slot formed therein and extending between said prongs, means moving said knotting arm relatively to said yarn to wind a portion of the yarn intermediate the ends of the yarn about said knotting arm and through said slot to form a knotted loop in said portion of the yarn and to shift said knotted loop into said slot, means passing a thread through said loop, and means tensioning said yarn to cause said loop to withdraw from said slot and to form a knot holding said thread.

4. In a textile tying machine, in combination, a knotting arm, means moving said knotting arm into contact with a stretched yarn over the latter and at substantially right angles thereto, means moving said knotting arm downwardly in relation to said yarn, means turning said knotting arm to wind a portion of the yarn intermediate the ends of the yarn about the outer surfaces of said knotting arm, means swinging said knotting arm to form a knotted loop in said portion of the yarn, means withdrawing said knotted loop from contact with the outer surfaces of said knotted arm, means passing a thread through said loop, and means tensioning said yarn to cause said loop to form a knot holding said thread.

5. In a textile tying machine, in combination, a knotting arm having a bifurcated end comprising two prongs and a slot formed therein and extending between said prongs, means moving said knotting arm into contact with a stretched yarn over the latter substantially right angles thereto, means moving said knotting arm downwardly in relation to said yarn, means turning said knotting arm to wind a portion of the yarn intermediate the ends of the yarn about the outer surfaces of said knotting arm, means swinging said knotting arm to move adjacent to said wound yarn portion into said slot, whereby a knotted loop is formed in said portion of the yarn, means moving said knotting arm further downwards in relation to said yarn to withdraw said knotted loop from contact with the outer surfaces of said knotting arm and to move said knotted loop into said slot, means passing a thread through said loop, and means tensioning said yarn to cause said loop to form a knot holding said thread.

6. In a textile tying machine, in combination, a knotting arm, means moving said knotting arm while the latter extends horizontally into contact with a horizontally stretched yarn over said yarn and at substantially right angles thereto, means moving said knotting arm vertically downwards and turning it about a vertical axis to wind a portion of the yarn intermediate the ends of the yarn about the outer surfaces of said knotting arm, means swinging said knotting arm from the horizontal position to a vertical position to form a knotted loop in said portion of the yarn, means moving the knotting arm further downwards to withdraw said knotted loop from contact with the outer surfaces of said knotted arm, means passing a thread through said loop, and means tensioning said yarn to cause said loop to form a knot holding said thread.

7. In a textile tying machine, in combination, a knotting arm, supports situated on both sides of said yarn, and having parallel portions, means moving said knotting arm and said parallel portions of the supports into contact with a stretched yarn over the latter and at substantially right angles thereto while said knotting arm extends substantially in a plane extending through said portions of the support, means moving said knotting arm downwardly in relation to said parallel portions of the supports, means turning said knotting arm about an axis perpendicular to said parallel portions of the supports to wind the portion of the yarn situated between said parallel portions of the supports about said knotting arm, means swinging said knotting arm to a position substantially at right angles to said parallel portions of the supports to form a knotted loop in said portion of the yarn, means moving said knotting arm further downward in relation to said parallel portions of the supports to slip said knotted loop off said knotted arm, means passing a thread through said loop, and means tensioning said yarn to cause said loop to form a knot holding said thread.

8. In a textile tying machine, in combination, a knotting arm having a bifurcated end comprising two prongs, a slot formed therein and extending between said prongs, and a passage formed in said prongs and extending at right angles to said slot, means moving said knotting arm into contact with a stretched yarn over the latter and at substantially right angles thereto, means moving said knotting arm downwardly in relation to said yarn, means turning said knotting arm to wind a portion of the yarn intermediate the ends of the yarn about the outer surfaces of said knotting arm, means swinging said knotting arm to move the yarn adjacent to said wound yarn portion into said slot, whereby a knotted loop is formed in said portion of the yarn, means moving said knotting arm further downwards in relation to said yarn to withdraw said knotted loop from contact with the outer surfaces of said knotting arm and to move said knotted loop into said slot, means passing a thread through said loop, and means tensioning said yarn to cause said loop to form a knot holding said thread.

9. In a textile tying machine, in combination, a knotting arm having a bifurcated end comprising two prongs and a slot formed comprising two prongs, a slot formed therein and extending between said prongs, and a passage formed in said prongs and extending at right angles to said slot, means moving said knotting arm into contact with a stretched yarn over the latter and at substantially right angles thereto, means moving said knotting arm downwardly in relation to said yarn, means turning said knotting arm to wind a portion of the yarn intermediate the ends of the yarn about the outer surfaces of said knotting arm, means swinging said knotting arm to move the yarn adjacent to said wound yarn portion into said slot, whereby a knotted loop is formed in said portion of the yarn, means moving said knotting arm further downwards in relation to said yarn to withdraw said knotted loop from contact with the outer surfaces of said knotting arm and to move said knotted loop into said slot, means passing a thread through said loop, means maintaining said loop within said slot while the thread is passed through said loop and thereafter releasing said loop, and means tensioning said yarn to cause said loop to form a knot holding said thread.

10. In a textile tying machine, in combination, means moving a yarn substantially in the direction of its length, means engaging said yarn intermediate of its length, a plurality of flights constituting an endless chain situated adjacent to said yarn, each of said flights comprising means engaging said yarn intermediate its ends to form a knotted loop therein, means moving said endless chain of flights to cause each of said flights to move in the direction of movement of said yarn while said loop is being formed by that yarn, and means passing a thread through said loop, said yarn-moving means tensioning said yarn to cause said loop to form a knot holding said thread.

MAX STEINER.